United States Patent [19]
Pace

[11] Patent Number: 5,692,851
[45] Date of Patent: Dec. 2, 1997

[54] ELONGATED MEMBER CONNECTOR

[76] Inventor: Paul G. Pace, 26752-H Oak Ave., Canyon Country, Calif. 91351

[21] Appl. No.: 726,535

[22] Filed: Oct. 7, 1996

[51] Int. Cl.[6] .................................................... F16B 1/00
[52] U.S. Cl. ........................ 403/31; 403/322; 403/328
[58] Field of Search ............................ 403/31, 328, 321, 403/322, 15; 425/444

[56] References Cited

U.S. PATENT DOCUMENTS

| | | | |
|---|---|---|---|
| 3,065,011 | 11/1962 | De Pew | 403/328 |
| 3,139,660 | 7/1964 | Foster et al. | 403/15 |
| 3,737,268 | 6/1973 | Ryder | 425/444 X |
| 4,636,135 | 1/1987 | Bancon | 403/322 X |
| 4,647,089 | 3/1987 | Zangrando | 403/322 X |
| 4,679,956 | 7/1987 | Douglas et al. | 403/322 X |
| 5,040,915 | 8/1991 | Stuart et al. | 403/322 |
| 5,211,501 | 5/1993 | Nakamura et al. | 403/322 |
| 5,439,310 | 8/1995 | Evenson et al. | 403/24 X |

FOREIGN PATENT DOCUMENTS 867706   5/1961   United Kingdom ................... 403/31

Primary Examiner—Kenneth J. Dorner
Assistant Examiner—William L. Miller
Attorney, Agent, or Firm—Jack C. Munro

[57] ABSTRACT

A connector for an elongated member which is composed of a male part and a female part. The female part is fixedly mounted onto an end of an elongated member with the male part being fixed onto a separate structure or vice versa. The male part includes a fluid operated piston which is to be supplied fluid pressure from a remote source. Axially pressing of the female member in contact with the male member will result in the connector being located in a locked relationship. Application of fluid pressure from the remote source will cause the connector to move to an unlocked relationship permitting locating of the female part in a spaced apart relationship from the male part.

5 Claims, 3 Drawing Sheets

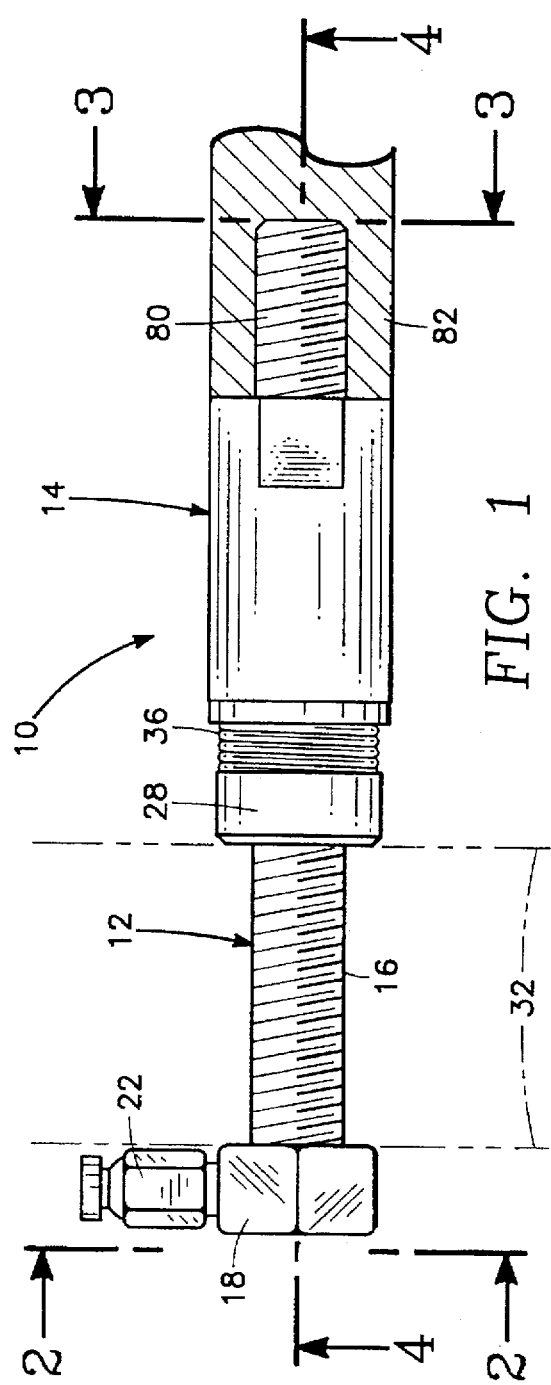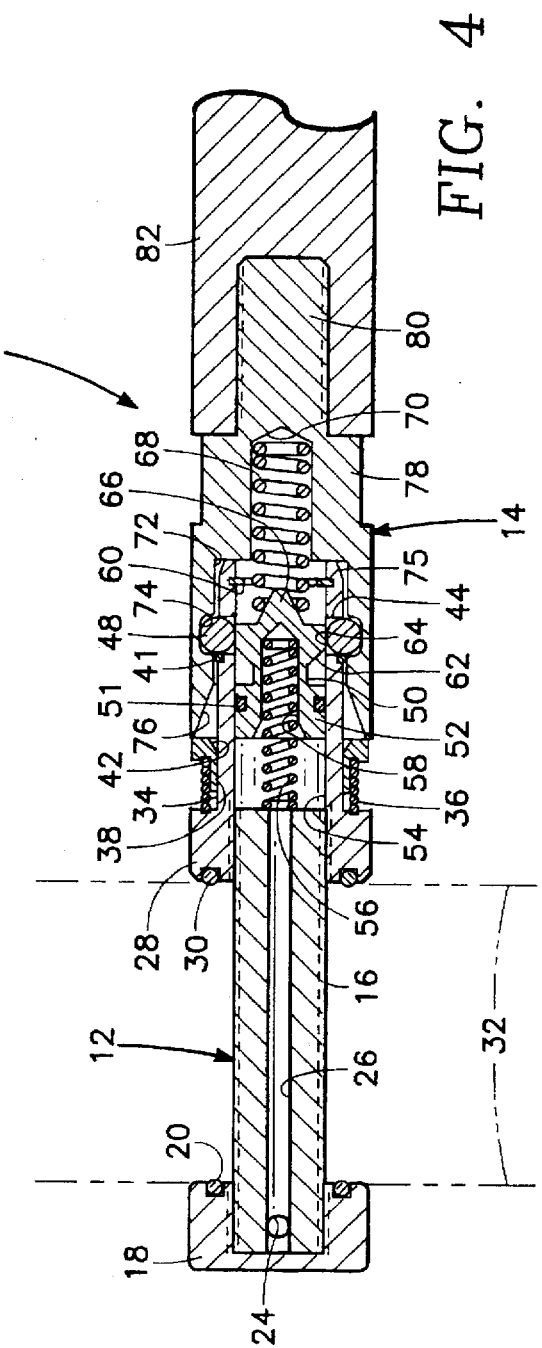

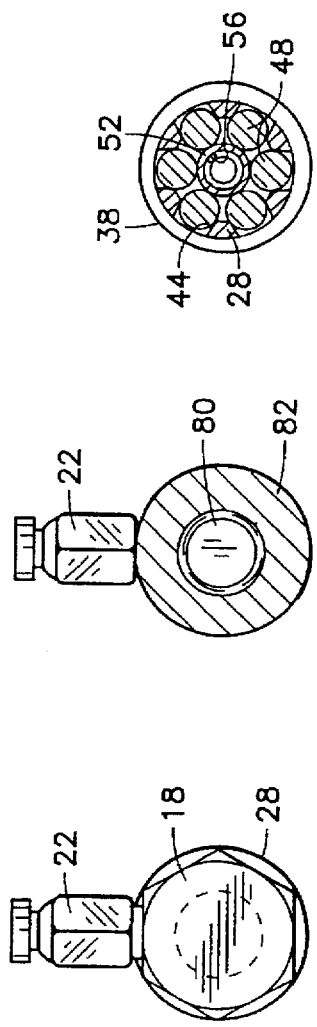
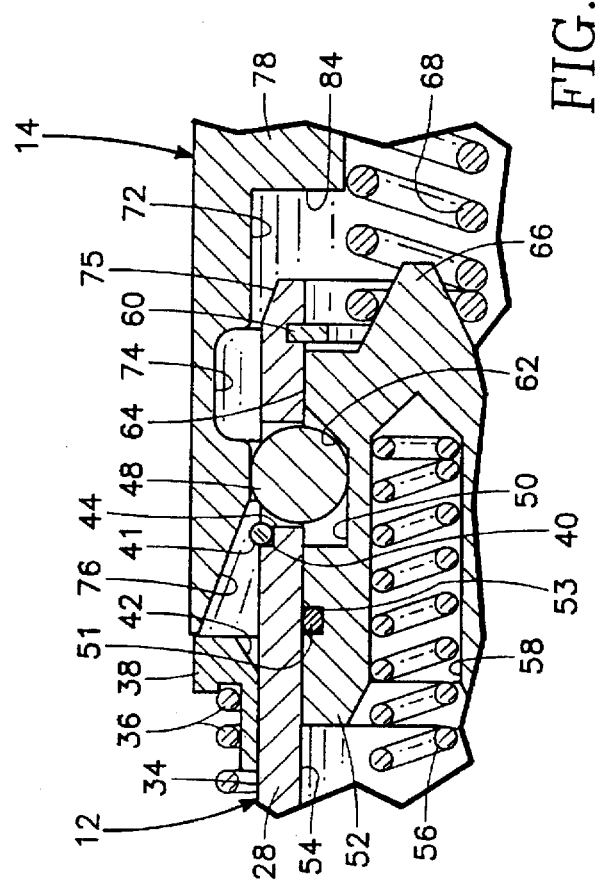

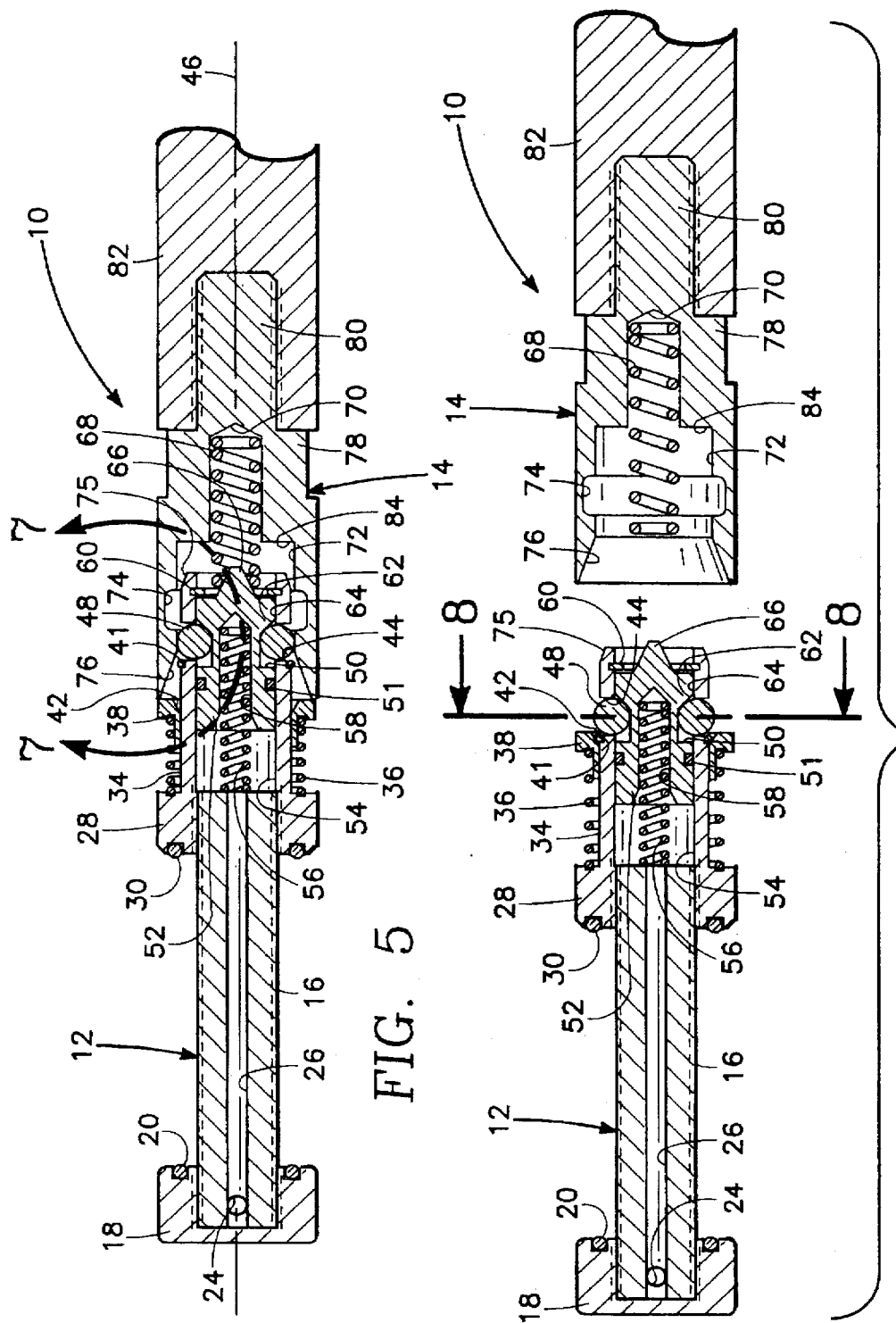

ELONGATED MEMBER CONNECTOR

BACKGROUND OF THE INVENTION

1) Field of the Invention

The field of this invention relates to connectors and more particularly to a connector for an elongated member which is mounted onto an end of the elongated member.

2) Description of the Prior Art

The typical method of mounting an elongated member, such as a rod to a plate, would be by forming a threaded connection on the end of the rod and inserting that threaded connection through a hole in the plate, and then mounting of a fastener nut in conjunction with the threaded end of the rod, thereby securing it to the plate. However, such connections are not easily accomplished in certain environments. For example, a confined quartered environment would be in conjunction with a molding machine where there are utilized a plurality of elongated rods, commonly called ejector rods or knock-out bars, which are used to eject molded parts from the mold. These elongated rods are mounted onto a plate which is commonly termed a butterfly plate. There are numerous points of connection for the elongated rods to the butterfly plate. These numerous points of connection vary according to the individual desires of the person operating the mold. Also, one particular mold might require a certain placement of these rods with another type of mold requiring another type of placement. That means the position of the rods have to be changed on the butterfly plate. In almost every mold machine, the position of the butterfly plate is not readily accessible. It is also dangerous because to change the position of the rods requires that the individuals hands, wrists and arms be positioned within the molding machine and if the molding machine is accidentally activated, the individual could be injured.

Although the structure of this invention has been found to be of particular advantage for the mounting of knock-out bars for molds, it is to be considered to be within the scope of this invention that this invention could be utilized in conjunction with any elongated member where it is desired to remotely secure the elongated member to a separate structure and remotely disconnect the elongated member from the separate structure.

SUMMARY OF THE INVENTION

A connector for an elongated member which utilizes a male part and a female part. The male part could be mounted to the separate structure and the female mounted to the elongated member or vice versa. One of the parts is mounted to one end of the elongated member. When this part is moving in contact with the other part and sufficient force is applied, three in number of different springs are compressed. One of the springs is an external spring which applies a continuous force between the two parts tending to separate the parts. The second spring is to apply force to a fluid actuated piston located internally of the connector with the bias of this spring tending to locate the piston in an extended position which permits separating of the two parts. There is a third spring that applies force to the piston and overrides the second spring which locates the piston in a retracted position. When in the retracted position, a series of balls of the male member are forced outwardly to occupy a position within a groove of the female part thereby achieving the locked relationship between the male part and the female part. When fluid pressure is applied to the fluid piston, the fluid piston will move against the bias of the third spring compressing such and move the fluid piston to the extended position. Separation of the male and female parts is then possible.

The primary objective of the present invention is to construct a connector which achieves a secure connection between an elongated member and a separate structure with it only being required that the elongated member be forcibly moved in conjunction with the connector that is mounted on the separate structure.

Another objective of the present invention is to provide a connector for an elongated member which permits the connector to be disconnected by the application of fluid pressure from a remote source.

Another objective of the present invention is to construct a connector which is constructed of relatively few parts and thereby can be manufactured relatively inexpensively and thereby sold to the ultimate consumer at a relatively inexpensive price.

BRIEF DESCRIPTION OF THE DRAWINGS

FIG. 1 is a side elevational view of the connector of the present invention depicting the typical installation for the connector and showing the connector in the locked position;

FIG. 2 is a back end view of the connector of the present invention taken along line 2—2 of FIG. 1;

FIG. 3 is a front end view, partly in cross-section, of the connector of the present invention taken along line 3—3 of FIG. 1;

FIG. 4 is a longitudinal cross-sectional view through the connector of the present invention taken along line 4—4 of FIG. 1 again showing the connector in the locked position;

FIG. 5 is a cross-sectional view similar to FIG. 4 showing the connector in the unlocked position and depicting partial separation of the connector;

FIG. 6 is a cross-sectional view similar to FIG. 5 but showing the connector in its disengaged position;

FIG. 7 is an enlarged view of a portion of the connector taken along line 7—7 of FIG. 5; and FIG. 8 is a cross-sectional view through the locking balls utilized in conjunction with the connector of the present invention taken along line 8—8 of FIG. 6.

DETAILED DESCRIPTION OF THE PREFERRED EMBODIMENT

Referring particularly to the drawings, there is shown the connector 10 of this invention. Connector 10 is composed of a male part 12 and a female part 14. The male part 12 includes an elongated exteriorly threaded rod 16 the outer end of which is threadably secured to a nut cap 18. The inner surface of the nut cap 18 has an O-ring 20 mounted about the threaded rod 16. A fitting 22 is fixedly secured to the nut cap 18. Fitting 22 is for connection to a fluid pressure line (not shown). This fluid pressure line is to be connected to a source of fluid pressure which is also not shown. The fluid pressure could comprise hydraulic or pneumatic with generally pneumatic being preferred.

The fluid pressure from the fitting 22 is conducted through hole 24 which is transversely formed through the elongated threaded rod 16. Hole 24 connects to a centrally located passage 26 formed within the elongated threaded rod 16. The outer end of the threaded rod 16 is fixedly mounted to a sleeve 28. The sleeve 28 has an outer surface within which is mounted an O-ring 30 with the O-ring 30 also surrounding the elongated threaded rod 16. The elongated threaded rod 16 is to be threaded within the sleeve 28 until the nut cap 18 and the sleeve 28 are tightly secured against opposite sides of a separate structure in the form of a mounting plate 32. A typical structure for the mounting plate 32 would be a butterfly plate within a plastic molding machine. The O-rings 28 and 30 form a tight seal with the mounting plate 32.

The exterior surface of the sleeve 28 includes an annular relief 34. Located within the annular relief 34 is a coil spring 36. Also mounted within the annular relief 34 is a collar 38. One end of the spring 36 abuts against the sleeve 28 with the opposite end of the spring 36 abutting against the collar 38. The collar 38 is slidably mounted within the annular relief 34. The outer end of the annular relief 34 includes an annular recess 40 within which is mounted an O-ring 41. If annular recess 42 contacts O-ring 41 such will prevent collar 38 from separating from the sleeve 28 and the outer limit of movement of the collar 38 is defined. The inward limit of movement on the collar 38 is shown in FIGS. 1 and 4 of the drawings, Formed within the sleeve 28 is a series of holes 44 with actually six in number of the holes 44 being shown. The holes 44 are located in an evenly spaced apart relationship concentrically disposed about the longitudinal center axis 46 of the connector 10. Mounted within each hole 44 is a steel ball 48. The inner surface of the balls 48 is supported in an annular groove 50 formed within a piston 52. The piston 52 is slidably mounted within center bore 54. The O-ring 41 also protrudes slightly axially so as to prevent balls 48 from falling out of holes 44 when male part 12 is separated from female part 14.

A coil spring 56 is mounted within the center bore 54 with one end of the coil spring 56 abutting against the front end of the elongated threaded rod 16. The opposite end of the coil spring 56 rides within center cavity 58 of the piston 52. The outer limit of movement of the piston 52 is defined by snap ring 60 which is mounted within the center bore 54. The piston 52 includes a fluid seal in the form of an O-ring 51 to prevent fluid leakage as well as a cam surface 62 which connects to annular shoulder 64. The O-ring 51 sets in annular groove 53 formed in piston 52. The outer end of the piston 52 is formed into a point 66. Mounted about the point 66 is one end of a coil spring 68. The coil spring 68 is positioned and restrained within center bore 70 of the female part 14. The center bore 70 includes an enlarged front portion 72 which includes an annular groove 74. The enlarged front portion 72 terminates in a chamfered front forward section 76. Center bore 70, the enlarged front portion 72, the annular groove 74 and the chamfered forward section 76 are formed within housing 78 which comprises the female part 14. The back end of the housing 78 connects to a cylindrical threaded section 80 which is to be threadably secured to one end of the elongated member 82. Typically the elongated member will comprise a rod such as a ejector rod or what is commonly termed a knock-out bar for a molding machine.

The operation of the connector 10 of this invention is as follows: With the forward end of the sleeve 28 abutting against shoulder 84, balls 48 will be forced outwardly by riding up cam surface 62 with the shoulder 64 preventing inward motion of the balls 48 (FIG. 4). In this position the spring 36 is fully compressed. The spring 68 is of a greater bias than spring 56 which will result in the piston 52 assuming a retracted position with the shoulder 64 preventing inward movement of the balls 48. This is the locked position for the elongated member.

In order to achieve this locked position, it is only necessary to force elongated member 82 and the female part 14 onto the sleeve 28. The chamfered forward section 76 functions as a guide for the entry of the sleeve 28 into the enlarged front portion 72 of the bore 70. The front end of sleeve 28 is also chamfered forming annular inclined surface 75 to further assist in guiding entry of sleeve 28 into enlarged front portion 72. Upon the sleeve 28 coming into contact with the shoulder 84, the balls 48 will be positioned within the annular groove 74. This fixes the position of the elongated member 82 to the mounting plate 32.

Now let it be assumed that it is desired to disengage the elongated member 82 from the mounting plate 32. In order to achieve this, fluid pressure is to be supplied through hole 24 and passage 26 into a center bore 54. This fluid pressure pushes against the back side and seal of the piston 52. This force, coupled with the bias of the spring 56, will override the bias of the spring 68 and cause the piston 52 to be moved forwardly until it comes into contact with the snap ring 60. At this particular time the spring 68 is substantially compressed and the balls 48 are permitted to fall within the annular groove 50 disengaging from the annular groove 74. The housing 78 is now capable of being slid off of sleeve 28 and this sliding movement is facilitated by the bias of the spring 36 which applies force to the collar 38 which pushes against the outer end of the housing 78 of the female part 14. This sliding movement is assisted by spring 68 pushing against female part 14. Spring 68 has a higher spring force than spring 36. This will result in separation of the female part 14 from the male part 12 as is shown in FIG. 6 of the drawings. Once separation has occurred, the fluid pressure applied within the passage 26 is then eliminated at which time the piston 52 will remain in its established position directly against the snap ring 60.

It is important that the piston 52 remain in this established position and it is for that reason that the coil spring 56 is utilized. The spring 56 exerts a bias on the piston 52 to locate the piston 52 in the position shown in FIG. 6 (when male part 12 is disengaged from female part 14) which is with the balls 48 retracted within annular groove 50. If per chance the piston 52 was permitted to be moved back (no spring 56) so that the shoulder 64 was positioned underneath the balls 48 and the balls 48 were located in the outward position, it would make it impossible for the male part 12 to engage with the female part 14 since the balls 48 would already be in the outward extended position and would not be able to pass through the enlarged front portion 72.

What is claimed is:

1. A connector comprising:

a male/female fastener comprising a first part and a second part, said first part and said second part capable of being lockingly secured together in a locked relationship, said first part and said second part being separable into a spaced apart relationship;

said male/female fastener including a series of balls, said balls to be positioned within a groove when said first part and said second part are in said locked relationship, said groove being formed in said first part, said balls to be spaced from said groove in a disengaged position when said first part and said second part are in said spaced apart relationship; and said second part including a fluid actuated piston, said piston being movable between a retracted position and an extended position, said piston connecting with said balls, said piston locating said balls within said groove when said first part and said second part are in said locked relationship and said piston is in said retracted position, with said piston in said extended position said balls are in said disengaged position, when said first part and said second part are in said locked relationship said piston is biased by a first spring towards said retracted position, said first spring being mounted within said first part, when said first part and said second part are in said spaced apart relationship said piston is biased by a second spring towards said extended position, said second spring being mounted in said second part.

2. The connector as defined in claim 1 wherein:

a third spring mounted on said second part and located between said first part and said second part when in said locked relationship, said third spring exerting a continuous bias on said second part tending to move said second part towards said spaced apart relationship.

3. The connector as defined in claim 2 wherein:

said balls being mounted within a series of holes formed within said second part, an elastic ring member mounted on said second part, said elastic ring member slightly protruding into said holes preventing disconnection of said balls from said holes and when said first part and said second part are in said spaced apart relationship, said elastic ring member being slightly deformed when said balls move into said groove when said first part and said second part are in said locked relationship.

4. The connector as defined in claim 3, wherein:

with said first part and said second part in said spaced apart relationship there also being positioned a collar annularly about said balls defining an annular position to insure that said balls do not disconnect from said holes, said collar connecting with said third spring and being continuously biased toward said annular position.

5. The connector as defined in claim 4 wherein:

said elastic ring member connecting with said collar when said collar is in said annular position.

* * * * *